(12) United States Patent
Sternin

(10) Patent No.: US 6,751,627 B2
(45) Date of Patent: Jun. 15, 2004

(54) METHOD AND APPARATUS TO FACILITATE ACCESSING DATA IN NETWORK MANAGEMENT PROTOCOL TABLES

(75) Inventor: Jeffrey Y. Sternin, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 511 days.

(21) Appl. No.: 09/911,887

(22) Filed: Jul. 23, 2001

(65) Prior Publication Data

US 2003/0018688 A1 Jan. 23, 2003

(51) Int. Cl.[7] ............................................. G06F 17/30
(52) U.S. Cl. ........................... 707/101; 707/2; 707/3; 707/10; 709/224; 709/230; 709/242
(58) Field of Search ................................. 707/100, 101, 707/2, 3, 4, 5, 10; 709/224, 230, 242

(56) References Cited

U.S. PATENT DOCUMENTS

| | | | | |
|---|---|---|---|---|
| 5,204,958 A | * | 4/1993 | Cheng et al. | 707/102 |
| 5,414,704 A | * | 5/1995 | Spinney | 370/389 |
| 5,594,899 A | * | 1/1997 | Knudsen et al. | 707/2 |
| 5,917,821 A | * | 6/1999 | Gobuyan et al. | 370/392 |
| 5,946,679 A | * | 8/1999 | Ahuja et al. | 707/3 |
| 6,032,216 A | * | 2/2000 | Schmuck et al. | 710/200 |
| 6,047,283 A | * | 4/2000 | Braun | 707/3 |
| 6,185,569 B1 | * | 2/2001 | East et al. | 707/101 |
| 6,266,660 B1 | * | 7/2001 | Liu et al. | 707/3 |
| 6,651,099 B1 | * | 11/2003 | Dietz et al. | 709/224 |
| 6,665,725 B1 | * | 12/2003 | Dietz et al. | 709/230 |
| 2003/0023605 A1 | * | 1/2003 | Sternin et al. | 707/100 |

FOREIGN PATENT DOCUMENTS

| | | | | |
|---|---|---|---|---|
| EP | | 0621706 A2 | * 10/1994 | ........... H04L/12/24 |

* cited by examiner

Primary Examiner—Srirama Channavajjala
Assistant Examiner—Khanh Pham
(74) Attorney, Agent, or Firm—Silicon Valley IP Group, PC; Kevin J. Zilka; Christopher J. Hamaty

(57) ABSTRACT

One embodiment of the present invention provides a system that facilitates accessing a network management protocol table. The system operates by first collecting a network management protocol tuple that includes data related to a network connection. Next, the system creates a hash index from the network management protocol tuple. This network management protocol tuple is inserted into the network management protocol table. The system then saves a pointer to the row indexed by the hash index in a hash table. The system also forms a search index using data within the network management protocol tuple that identifies the data pointed to by the hash index in the hash table. This search index is inserted into a search tree, so that the hash index provides fast insertion into the network management protocol table and the search index in the search table provides fast ordered retrieval from the network management protocol table.

12 Claims, 4 Drawing Sheets

METHOD AND APPARATUS TO FACILITATE ACCESSING DATA IN NETWORK MANAGEMENT PROTOCOL TABLES

RELATED APPLICATION

The subject matter of this application is related to the subject matter in a co-pending non-provisional application by Jeffrey Y. Sternin, Steven C. Tung, and Yongping Qi entitled, "Method and Apparatus to Facilitate Fast Network Management Protocol Replies in Large Tables," having Ser. No. 09/905,346, now pending, and filing date Jul. 13, 2001.

BACKGROUND

1. Field of the Invention

The present invention relates to computer network management. More specifically, the present invention relates to a method and an apparatus that facilitates accessing network management protocol tables.

2. Related Art

Network management database servers typically maintain tables related to network traffic. For example, a network management database server can maintain a table for transactions, which includes columns for virtual channel number, source Internet protocol (IP) address, destination IP address, number of packets transmitted, number of octets—8-bit bytes—transmitted, number of reverse packets transmitted, and number of reverse octets transmitted. In general, the network management database server can maintain multiple tables, wherein each table includes columns for different sets of data.

Each row within these tables contains the data, or tuple, related to an individual network connection. A network connection is identified by source IP address and destination IP address, and for connections using virtual channels, the channel number.

During operation, a monitor, for example a remote monitor (RMON), collects a tuple for each transaction on the monitored network. If the connection does not have an entry in the table, an entry is added to the table for the connection, otherwise, the existing entry is updated with respect to the number of packets and number of octets being transferred in each direction.

In order to facilitate rapidly entering data into rows within the tables, these tables are typically accessed using a hash code. A hash code is generated using the connection information—source IP address, destination IP address, and possibly the virtual channel number—and is used as an index to locate the correct row within the table. Hash code generators are well known in the art and will not be discussed further herein. The hash code points to where the tuple resides, or should reside if it is in the table. However, one consequence of using the hash code is that the entries in the table are in a random order which can create problems in performing some tasks.

Operators access these tuples using a network management protocol agent to determine the operating condition of the network. Typically, the operator requests the next row within the table. To determine the next row in the table, the system first sorts the table, and then accesses the row following the current row in the table. This procedure works well for small tables. However, as the table grows large, the time to sort the table increases. With very large tables, the sort time becomes quite large and exceeds the time between transactions on the network, thus interfering with the data collection process.

What is needed is a method and an apparatus that facilitates accessing network management protocol tables without the problems listed above.

SUMMARY

One embodiment of the present invention provides a system that facilitates accessing a network management protocol table. The system operates by first collecting a network management protocol tuple that includes data related to a network connection. Next, the system creates a hash index from the network management protocol tuple. This network management protocol tuple is inserted into the network management protocol table. The system then saves a pointer to the row indexed by the hash index in a hash table. The system also forms a search index using data within the network management protocol tuple that identifies the data pointed to by the hash index in the hash table. This search index is inserted into a search tree, so that the hash index provides fast insertion into the network management protocol table and the search index in the search table provides fast ordered retrieval from the network management protocol table.

In one embodiment of the present invention, the data related to the network connection includes a source address, a destination address, a number of packets, a number of octets, a number of reverse packets, and a number of reverse octets.

In one embodiment of the present invention, the data related to the network connection includes a virtual channel identifier.

In one embodiment of the present invention, the system collects a second network management protocol tuple from the network. The system then creates a second hash index from the second network management protocol tuple. Next, the system determines if the second hash index relates to the network connection identified by the previous hash index. If the second hash index relates to the network connection identified by the previous hash index, the system updates the number of packets, the number of octets, the number of reverse packets, and the number of reverse octets in the network management protocol tuple in the network management protocol table, so that the previous network management protocol tuple includes data from the second network management protocol tuple. If the second hash index does not relate to the network connection identified by the previous hash index, the system inserts the second network management protocol tuple into the network management protocol table and saves a pointer to the row indexed by the second hash index in the hash table. The system also forms a second search index using the data within the second network management protocol tuple that points to the second hash index. The system then inserts a pointer to the row indexed by the second hash index into the search tree.

In one embodiment of the present invention, the search tree is a balanced search tree, whereby the maximum search depth in one subtree of a node within the search tree differs from the maximum search depth in another subtree of the same node by no more than one.

In one embodiment of the present invention, the system receives a request to read a tuple within the network management protocol table. The system then searches the search tree for the tuple identified in the request. Next, the system locates the tuple within the network management protocol table using the search index within the search tree. The system then reads the tuple and returns the tuple in response to the request.

In one embodiment of the present invention, the system uses multiple search trees, wherein each search tree is sorted on different data within the network management protocol tuple.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
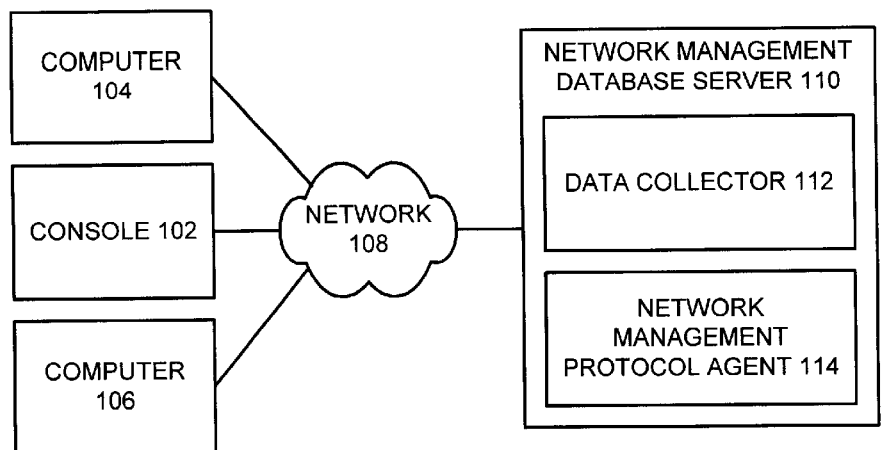
FIG. 1 illustrates computing devices coupled together in accordance with an embodiment of the present invention.

FIG. 1 illustrates computing devices coupled together in accordance with an embodiment of the present invention. Console 102, computers 104 and 106, and network management database server 110 are coupled together over network 108. Console 102, computers 104 and 106, and network management database server 110 can generally include any type of computer system, including, but not limited to, a computer system based on a microprocessor, a mainframe computer, a digital signal processor, a portable computing device, a personal organizer, a device controller, and a computational engine within an appliance.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Network management database server 110 collects and saves data related to transactions across network 108 between computers such as computers 104 and 106. A practitioner with ordinary skill in the art will note that there may be many more computers coupled to network 108 than shown. In fact, these computers may number in the hundreds or thousands.

Console 102 is used to access network management database server 110 across network 108 to access the data maintained by network management database server 110. There may also be more than one console coupled to network 108.

Network management database server 110 includes data collector 112 and network management protocol agent 114. Data collector 112 collects data concerning transactions on network 108 as described below in conjunction with FIG. 2. Network management protocol agent 114 communicates with console 102 to receive requests for data collected by data collector 112 and returns this data across network 108 to console 102.

Data Collector 112

Figure 2:
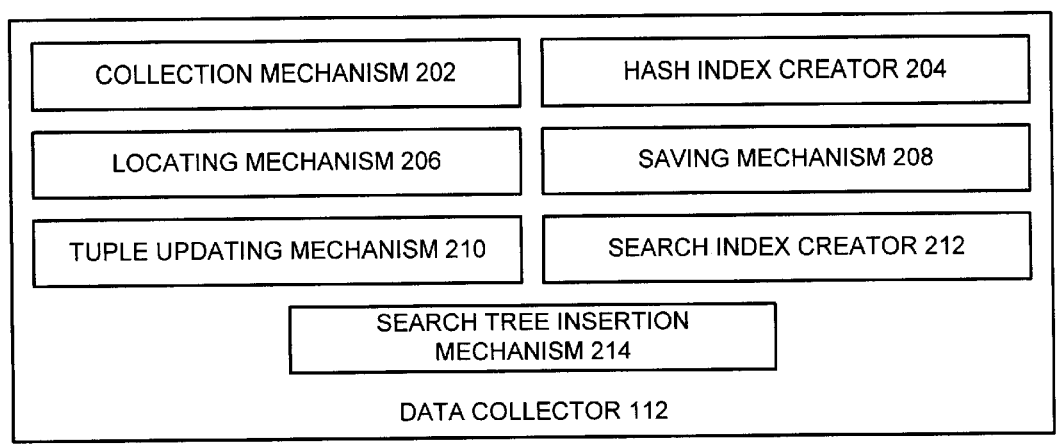
FIG. 2 illustrates data collector 112 in accordance with an embodiment of the present invention.

FIG. 2 illustrates data collector 112 in accordance with an embodiment of the present invention. Data collector 112 includes collection mechanism 202, hash index creator 204, locating mechanism 206, saving mechanism 208, tuple updating mechanism 210, search index creator 212, and search tree insertion mechanism 214.

Collection mechanism 202 monitors network transactions on network 108 and collects data—or tuples—concerning these transactions. For example, collection mechanism 202 can collect the source Internet protocol (IP) address, the destination IP address, the number of packets sent from source to destination, the number of octets—8 bit bytes—sent from source to destination, the number of packets sent from destination to source, and the number of octets sent from destination to source. The number of packets sent from destination to source can be termed reverse packets or simply r-packets while the number of octets sent from destination to source can be termed reverse octets or simply r-octets. Additionally, if the network is a virtual network, collection mechanism 202 can collect the channel number.

Hash index creator 204 creates a hash of the identifying parameters of the tuples collected by collection mechanism 202. Typically, these identifying parameters include channel, source IP address, and destination IP address. Hash mechanisms and algorithms are well known in the art and will not be described further herein. Any suitable hash mechanism can be used for hash index creator 204.

Locating mechanism 206 locates the proper row within network management protocol table 402 (see FIG. 4) for the tuple collected by collection mechanism 202 using the hash index created by hash index creator 204. If this row already contains a tuple relating to this network connection, tuple updating mechanism 210 updates the data in the saved tuple to include the data in the current tuple.

If this row is empty, indicating that the tuple relates to a previously unrecorded network connection, saving mechanism 208 saves the tuple in the indicated row of network management protocol table 402. After saving mechanism 208 saves the tuple in network management protocol table 402, search index creator 212 creates a search index for the tuple including a pointer to the entry in hash table 404. Next, search tree insertion mechanism 214 inserts the search index in search tree 406. Note that search tree insertion mechanism 214 inserts nodes in search tree 406 in a manner such that search tree 406 remains balanced. Mechanisms for balanced insertion into a search tree are well known and will not be discussed further herein. Note also that there can be more than one search tree, each sorted on different criteria. For example, search tree 406 can be sorted on (src IP, dst IP, channel), while search tree 408 can be sorted on (channel, src IP, dst IP). Other combinations are possible depending on the desired results.

Network Management Protocol Agent 114

Figure 3:
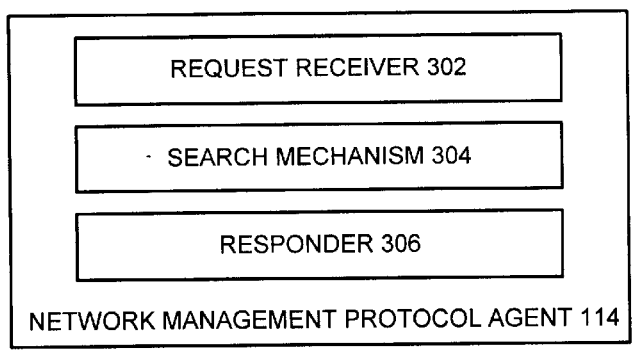
FIG. 3 illustrates network management protocol agent 114 in accordance with an embodiment of the present invention.

FIG. 3 illustrates network management protocol agent 114 in accordance with an embodiment of the present invention. Network management protocol agent 114 includes request receiver 302, search mechanism 304, and responder 306.

Request receiver 302 receives requests for data from network management protocol table 402 across network 108 from console 102. Search mechanism 304 locates the entry in a search tree, say search tree 406, related to the requested data. Search mechanism 304 can search any search table related to network management protocol table 402, depending on the search criteria.

After search mechanism 304 locates the proper tuple within network management protocol table 402, responder 306 returns the data from the tuple to console 102 across network 108.

Data Structures

Figure 4:
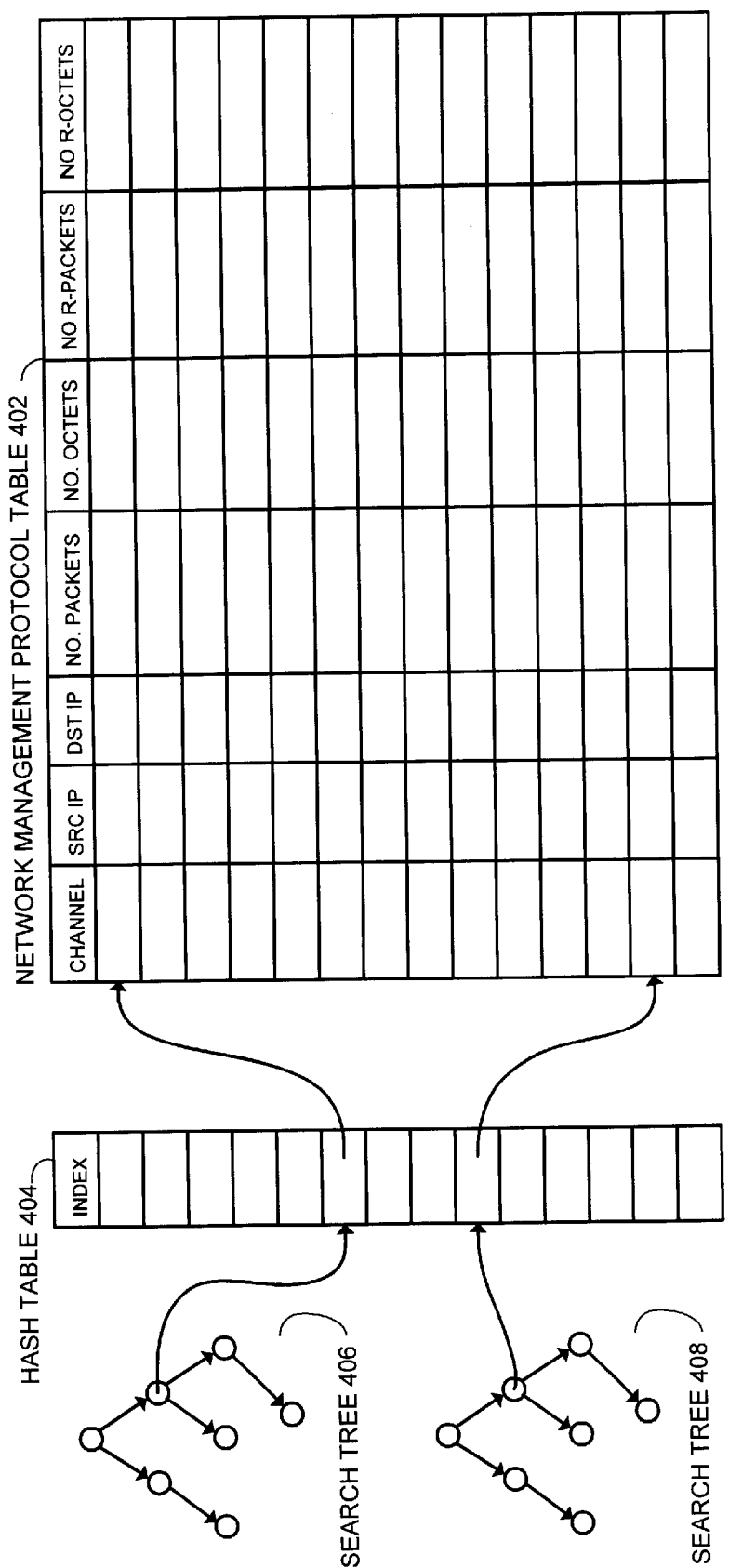
FIG. 4 illustrates various data structures in accordance with an embodiment of the present invention.

FIG. 4 illustrates various data structures in accordance with an embodiment of the present invention. These data structures include network management protocol table 402, hash table 404, and search trees 406 and 408.

Network management protocol table 402 stores data related to transactions between computers coupled to network 108. The data stored within network management protocol table 402 is dependent upon the requirements of the system. In this example, network management protocol table 402 includes data for a virtual network and includes columns for channel number, source Internet protocol (IP) address, destination IP address, number of packets, number of octets, number of reverse packets, and number of reverse octets.

Hash table 404 includes pointers to the tuples stored within network management protocol table 402. The hash index is based upon the channel number, source IP address, and destination IP address so that the tuple, or the place within network management protocol table 402 where the tuple should be stored, can be located efficiently and swiftly.

Search trees 406 and 408 include pointers to the hash table entries so that network management protocol agent 114 can locate an arbitrary tuple swiftly and efficiently. Note that requests from console 102 typically require the tuples to be in sorted order for efficient recovery of the next tuple in the table. Search trees 406 and 408 provide different orders for data recovery. For example, search tree 406 may be sorted on (channel, src IP, dst IP) while search tree 408 may be sorted on (src IP, dst IP, channel).

Collecting Data

Figure 5:
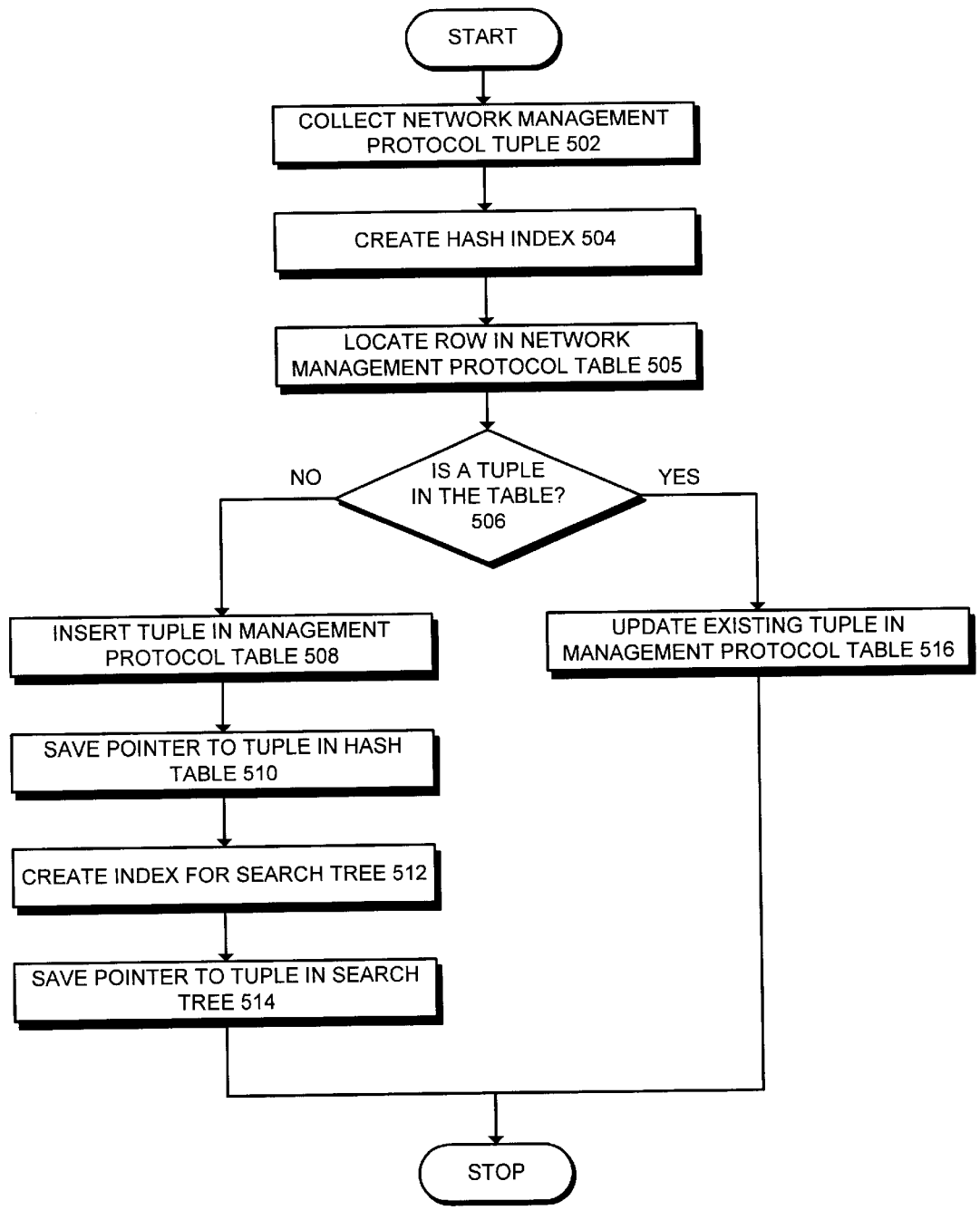
FIG. 5 is a flowchart illustrating the process of collecting and storing tuples in accordance with an embodiment of the present invention.

FIG. 5 is a flowchart illustrating the process of collecting and storing tuples in accordance with an embodiment of the present invention. The system starts when collection mechanism 202 within data collector 112 collects a network management protocol tuple on network 108 (step 502). Next, hash index creator 204 creates a hash index for the tuple (step 504). Locating mechanism 206 then locates the proper row within network management protocol table 402 for storing the tuple (step 505).

After locating the proper row within network management protocol table 402, data collector 112 determines if the row already contains a tuple (step 506). If the row does not contain a tuple, saving mechanism 208 inserts the tuple in network management protocol table 402 (step 508). Next, saving mechanism 208 saves a pointer to the tuple within hash table 404 (step 510). Search index creator 212 then creates a search index for a search tree, say search tree 406 (step 512). Search tree insertion mechanism 214 saves a pointer to the hash tree entry in search tree 406 (step 514). Note that 512 and 514 may be repeated to create and save entries for additional search trees such as search tree 408.

If the row contains a tuple at 506, tuple updating mechanism 210 updates the existing tuple within network management protocol table 402 to include the data in the current tuple (step 516).

Requests for Tuples

Figure 6:
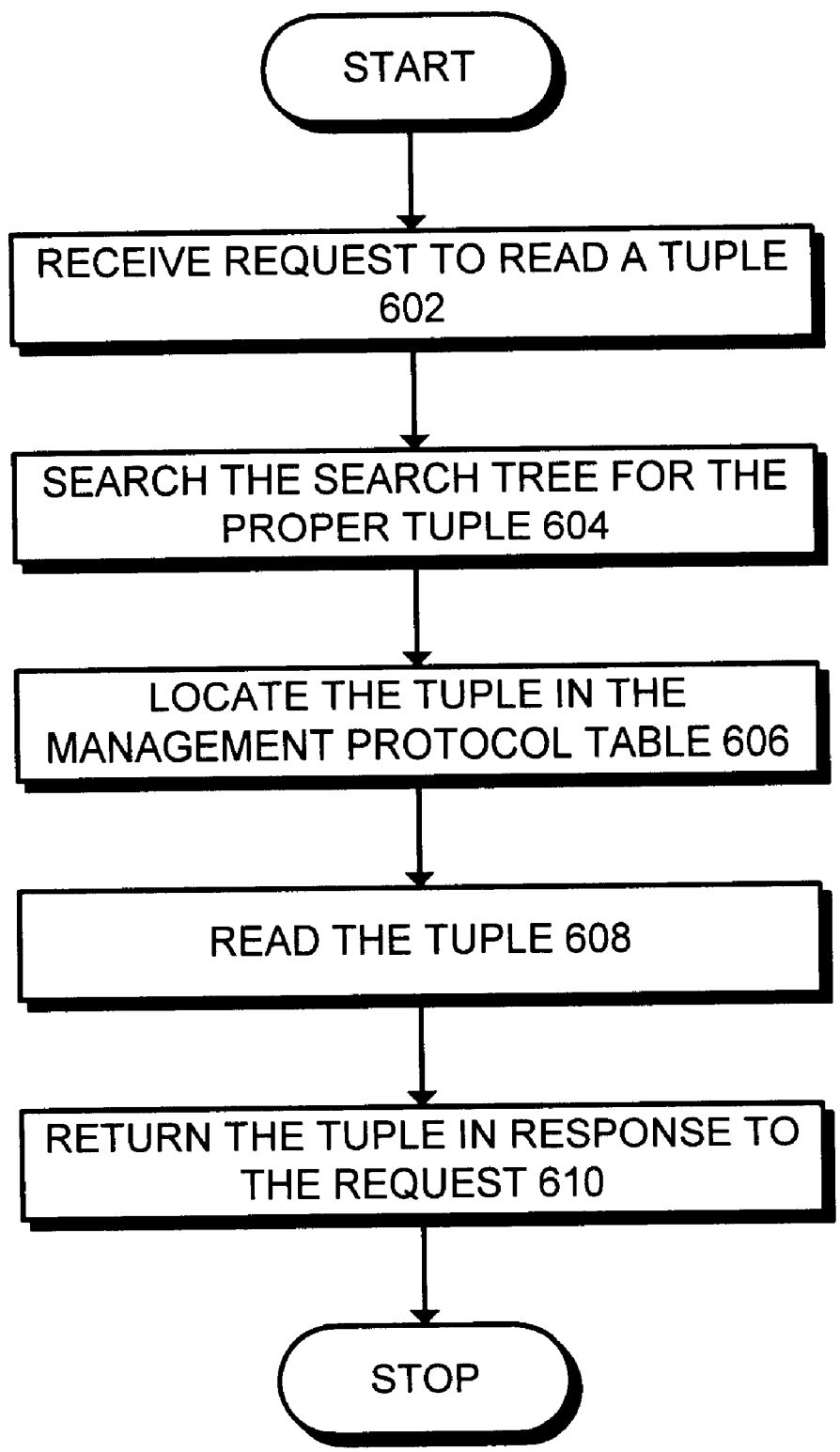
FIG. 6 is a flowchart illustrating the process of responding to requests for tuples in accordance with an embodiment of the present invention.

FIG. 6 is a flowchart illustrating the process of responding to requests for tuples in accordance with an embodiment of the present invention. The system starts when request receiver 302 in network management protocol agent 114 receives a request for tuple data from network management protocol table 402 across network 108 (step 602). Next, search mechanism 304 searches the search tree, say search tree 406, for the entry for the tuple (step 604).

After finding the entry in search tree 406, network management protocol agent 114 locates the tuple within network management protocol table 402 by following the pointer from search tree 406 (step 606). Next, network management protocol agent 114 reads the tuple from network management protocol table 402 (step 608). Finally, responder 306 returns the tuple to console 102 across network 108 (step 610).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate accessing a network management protocol table, comprising:

collecting a network management protocol tuple, wherein the network management protocol tuple includes data related to a network connection, wherein the data related to the network connection includes a source address, a destination address, a number of packets, a number of octets, a number of reverse packets, and a number of reverse octets;

creating a hash index from the network management protocol tuple;

inserting the network management protocol tuple into the network management protocol table;

saving a pointer to a row indexed by the hash index in a hash table;

forming a search index using a datum within the network management protocol tuple, wherein the search index identifies data pointed to by the hash index in the hash table;

inserting the pointer to the row indexed by the hash index into a search tree using the search index, whereby the hash index provides fast insertion into the network management protocol table and the search index provides fast ordered retrieval from the network management protocol table;

collecting a second network management protocol tuple;

creating a second hash index from the second network management protocol tuple;

determining if the second hash index relates to the network connection identified by the hash index; and if the second hash index relates to the network connection identified by the hash index, updating the number of packets, the number of octets, the number of reverse packets, and the number of reverse octets in the network management protocol tuple in the network management protocol table, so that the network management protocol tuple includes data from the second network management protocol tuple, otherwise inserting the second network management protocol tuple into the network management protocol table, saving a pointer to the row indexed by the second hash index in the hash table, forming a second search index using the datum within the second network management protocol tuple, wherein the second search index points to the second hash index, and inserting the pointer to the row indexed by the second hash index into the search tree;

wherein data related to the network connection includes a virtual channel identifier.

2. The method of claim 1, wherein the search tree is a balanced search tree, whereby a maximum search depth in a first subtree of a node within the search tree differs from the maximum search depth in a second subtree of the node by no more than one.

3. The method of claim 2, further comprising receiving a request to read a tuple within the network management protocol table;

searching the search tree for the tuple identified in the request;

locating the tuple within the network management protocol table using the search index within the search tree;

reading the tuple; and returning the tuple in response to the request.

4. The method of claim 3, further comprising a plurality of search trees, wherein each search tree within the plurality of search trees is sorted on a different datum within the network management protocol tuple.

5. A computer-readable storage medium storing instructions that when executed by a computer cause the computer to perform a method to facilitate accessing a network management protocol table, the method comprising:

collecting a network management protocol tuple, wherein the network management protocol tuple includes data related to a network connection, wherein the data related to the network connection includes a source address, a destination address, a number of packets, a number of octets, a number of reverse packets, and a number of reverse octets;

creating a hash index from the network management protocol tuple;

inserting the network management protocol tuple into the network management protocol table;

saving a pointer to a row indexed by the hash index in a hash table;

forming a search index using a datum within the network management protocol tuple, wherein the search index identities data pointed to by the hash index in the hash table;

inserting the pointer to the row indexed by the hash index into a search tree using the search index, whereby the hash index provides fast insertion into the network management protocol table and the search index provides fast ordered retrieval from the network management protocol table;

collecting a second network management protocol tuple;

creating a second hash index from the second network management protocol tuple;

determining if the second hash index relates to the network connection identified by the hash index; and if the second hash index relates to the network connection identified by the hash index, updating the number of packets, the number of octets, the number of reverse packets, and the number of reverse octets in the network management protocol tuple in the network management protocol table, so that the network management protocol tuple includes data from the second network management protocol tuple, otherwise inserting the second network management protocol tuple into the network management protocol table, saving a pointer to the row indexed by the second hash index in the hash table, forming a second search index using the datum within the second network management protocol tuple, wherein the second search index points to the second hash index, and inserting the pointer to the row indexed by the second hash index into the search tree;

wherein data related to the network connection includes a virtual channel identifier.

6. The computer-readable storage medium of claim 5, wherein the search tree is a balanced search tree, whereby a maximum search depth in a first subtree of a node within the search tree differs from the maximum search depth in a second subtree of the node by no more than one.

7. The computer-readable storage medium of claim 6, the method further comprising receiving a request to read a tuple within the network management protocol table;

searching the search tree for the tuple identified in the request;

locating the tuple within the network management protocol table using the search index within the search tree;

reading the tuple; and returning the tuple in response to the request.

8. The computer-readable storage medium of claim 7, the method further comprising a plurality of search trees, wherein each search tree within the plurality of search trees is sorted on a different datum within the network management protocol tuple.

9. An apparatus that facilitates accessing a network management protocol table, comprising:

a collecting mechanism that is configured to collect a network management protocol tuple, wherein the network management protocol tuple includes data related to a network connection, wherein the data related to the network connection includes a source address, a destination address, a number of packets, a number of octets, a number of reverse packets, and a number of reverse octets;

a creating mechanism that is configured to create a hash index from the network management protocol tuple;

an inserting mechanism that is configured to insert the network management protocol tuple into the network management protocol table;

a saving mechanism that is configured to save a pointer to a row indexed by the hash index in a hash table;

a forming mechanism that is configured to form a search index using a datum within the network management protocol tuple, wherein the search index identifies data pointed to by the hash index in the hash table;

a search tree insertion mechanism that is configured to insert the pointer to the row indexed by the hash index into a search tree using the search index, whereby the hash index provides fast insertion into the network management protocol table and the search index provides fast ordered retrieval from the network management protocol table;

wherein the collecting mechanism is further configured to collect a second network management protocol tuple;

wherein the creating mechanism is further configured to create a second hash index from the second network management protocol tuple;

a determining mechanism that is configured to determine if the second hash index relates to the network connection identified by the hash index; and an updating mechanism that is configured to update the number of packets, the number of octets, the number of reverse packets, and the number of reverse octets in the network management protocol tuple in the network management protocol table, so that the network management protocol tuple includes data from the second network management protocol tuple;

wherein the inserting mechanism is further configured to insert the second network management protocol tuple into the network management protocol table;

wherein the saving mechanism is further configured to save a pointer to the row indexed by the second hash index in the hash table;

wherein the forming mechanism is further configured to form a second search index using the datum within the second network management protocol tuple, wherein the second search index points to the second hash index;

wherein the search tree insertion mechanism is further configured to insert the pointer to the row indexed by the second hash index into the search tree;

wherein data related to the network connection includes a virtual channel identifier.

10. The apparatus of claim 9, wherein the search tree is a balanced search tree, whereby a maximum search depth in a first subtree of a node within the search tree differs from the maximum search depth in a second subtree of the node by no more than one.

11. The apparatus of claim 10, further comprising a receiving mechanism that is configured to receive a request to read a tuple within the network management protocol table;

a searching mechanism that is configured to search the search tree for the tuple identified in the request;

a locating mechanism that is configured to locate the tuple within the network management protocol table using the search index within the search tree;

a reading mechanism that is configured to read the tuple; and a returning mechanism that is configured to return the tuple in response to the request.

12. The apparatus of claim 11, including a plurality of search trees, wherein each search tree within the plurality of search trees is sorted on a different datum within the network management protocol tuple.

\* \* \* \* \*